A. R. BROKENSHIRE.
TIRE CARRIER FOR MOTOR CARS.
APPLICATION FILED NOV. 19, 1918.
1,312,829.
Patented Aug. 12, 1919.
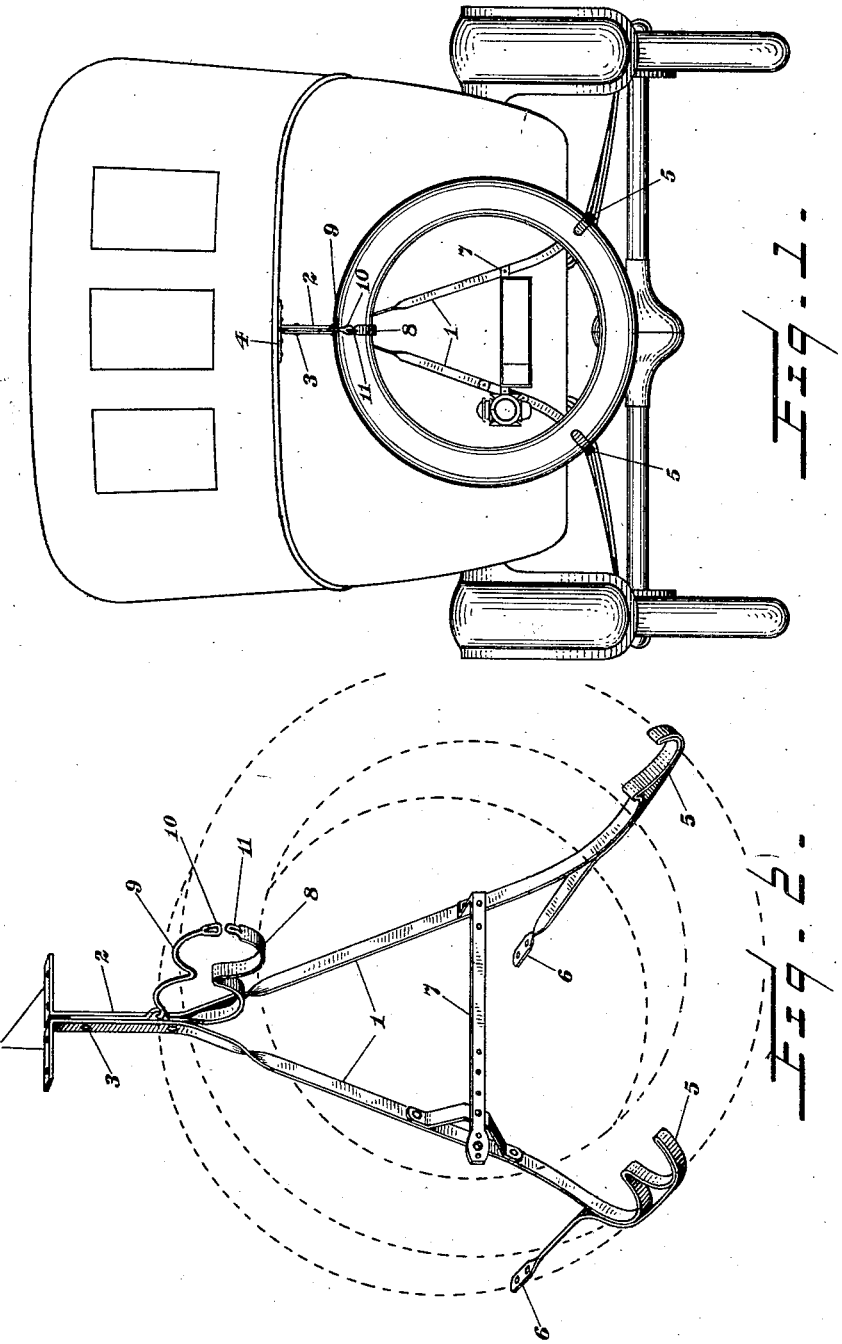
Inventor,
A. Brokenshire
By J. Edward Maybee
Atty.

UNITED STATES PATENT OFFICE.

ARTHUR RAYMOND BROKENSHIRE, OF FENELON FALLS, ONTARIO, CANADA, ASSIGNOR OF ONE-HALF TO FRED J. GOODMAN, OF FENELON FALLS, ONTARIO, CANADA.

TIRE-CARRIER FOR MOTOR-CARS.

1,312,829.

Specification of Letters Patent.

Patented Aug. 12, 1919.

Application filed November 19, 1918. Serial No. 263,147.

*To all whom it may concern:*

Be it known that I, ARTHUR RAYMOND BROKENSHIRE, of Fenelon Falls, in the county of Victoria, Province of Ontario, Canada, have invented certain new and useful Improvements in Tire-Carriers for Motor-Cars, of which the following is a specification.

This invention relates to devices for carrying one or more spare tires at the rear of a motor car, and my object is to devise a carrier particularly adapted for connection to Ford cars with a minimum amount of trouble.

I attain my object by means of the constructions hereinafter described and illustrated in the accompanying drawings in which—

Figure 1 is a rear view showing my device applied to a Ford car; and

Fig. 2 a perspective view of the device.

In the drawings like numerals of reference indicate corresponding parts in the different figures.

The main portions of my device are the bars 1, which are preferably of flat metal $\frac{3}{16}''$ by $\frac{7}{8}''$. These bars are secured together at their upper ends 2 by means of rivets 3. The extreme ends are bent to form at the top the laterally directed attaching lugs 4, which are provided with screw holes so that they may be screwed to the under side of the wood rim at the back of the body.

The bars spread in V-form and below their upper ends are twisted so that the flat sides lie in a transverse direction. Near their lower end, each bar is bent to form a support 5 for one or more tires. Each bar is then bent back under the support and extended forwardly as an arm 6, which is provided with suitable holes whereby it may be secured below the body by screws engaging in the lamp bracket holes.

On each Ford car there are holes at each side for the attachment of a lamp bracket, only one set of holes being employed at any one time. Before securing the arms in place it is necessary therefore to remove the lamp bracket. To support the lamp and also a license plate, I secure to the bars 1 the cross bar 7, which is provided with suitable holes or is otherwise adapted for its purpose. To hold the upper part of a tire or tires, I employ the support 8, the inner end of which is firmly secured between the upper parts of the bars 1. Above this support I provide a retainer 9, which is preferably provided at its outer end with a loop 10 adapted to fit over an eye 11 formed on the end of the support 8. A padlock may be employed to securely lock the tire or tires in position.

The device described, it will be seen, is very simple, is easily secured in place with a minimum of labor, and presents a neat appearance.

What I claim as my invention is:

1. A tire carrier for connection to the rear of the body of a motor car comprising two metal bars connected together at the top and spreading in V-form, each bar being bent to form at the top a laterally directed attaching lug, at the bottom a tire support and extending forwardly from the same an attaching arm.

2. A tire carrier as set forth in claim 1 having an upper tire support secured between the upper ends of the bars.

3. A tire carrier as set forth in claim 1 having an upper tire support secured between the upper ends of the bars and a retainer pivoted between said ends and adapted to coöperate with the said upper support.

Signed at Fenelon Falls, this 6th day of November, 1918.

ARTHUR RAYMOND BROKENSHIRE.

Witnesses:
R. N. MITCHELL,
C. MAUD LITTLETON.

Copies of this patent may be obtained for five cents each, by addressing the "Commissioner of Patents, Washington, D. C."